United States Patent [19]

Allen

[11] 4,020,638
[45] May 3, 1977

[54] AUXILLIARY FLUID POWER SYSTEM

[76] Inventor: Harvey D. Allen, 11309 Brightridge Drive, Seffner, Fla. 33584

[22] Filed: Oct. 28, 1975

[21] Appl. No.: 625,832

[52] U.S. Cl. .................................................. 60/718
[51] Int. Cl.² ....................................... F01B 21/04
[58] Field of Search ............ 60/698, 706, 709, 711, 60/712, 713, 716, 718

[56] References Cited

UNITED STATES PATENTS 2,779,213  1/1957  Fell et al. ........................ 60/718 X Primary Examiner—Allen M. Ostrager
Attorney, Agent, or Firm—Arthur W. Fisher, III

[57] ABSTRACT

An auxilliary fluid power system for use with a prime mover such as an internal combustion engine. The auxilliary fluid power system comprises a fluid drive means to generate a fluid pressure, an auxilliary drive means operable in a first or second direction attached to the prime mover power train, fluid conduit means including a fluid supply conduit and fluid return conduit coupled between the fluid drive means and the auxilliary drive means and a control means to selectively control the operative direction of the auxilliary drive means such that the auxilliary drive means boost the power of the prime mover when operating in the first direction and retards the prime mover when operating in the second direction.

9 Claims, 3 Drawing Figures

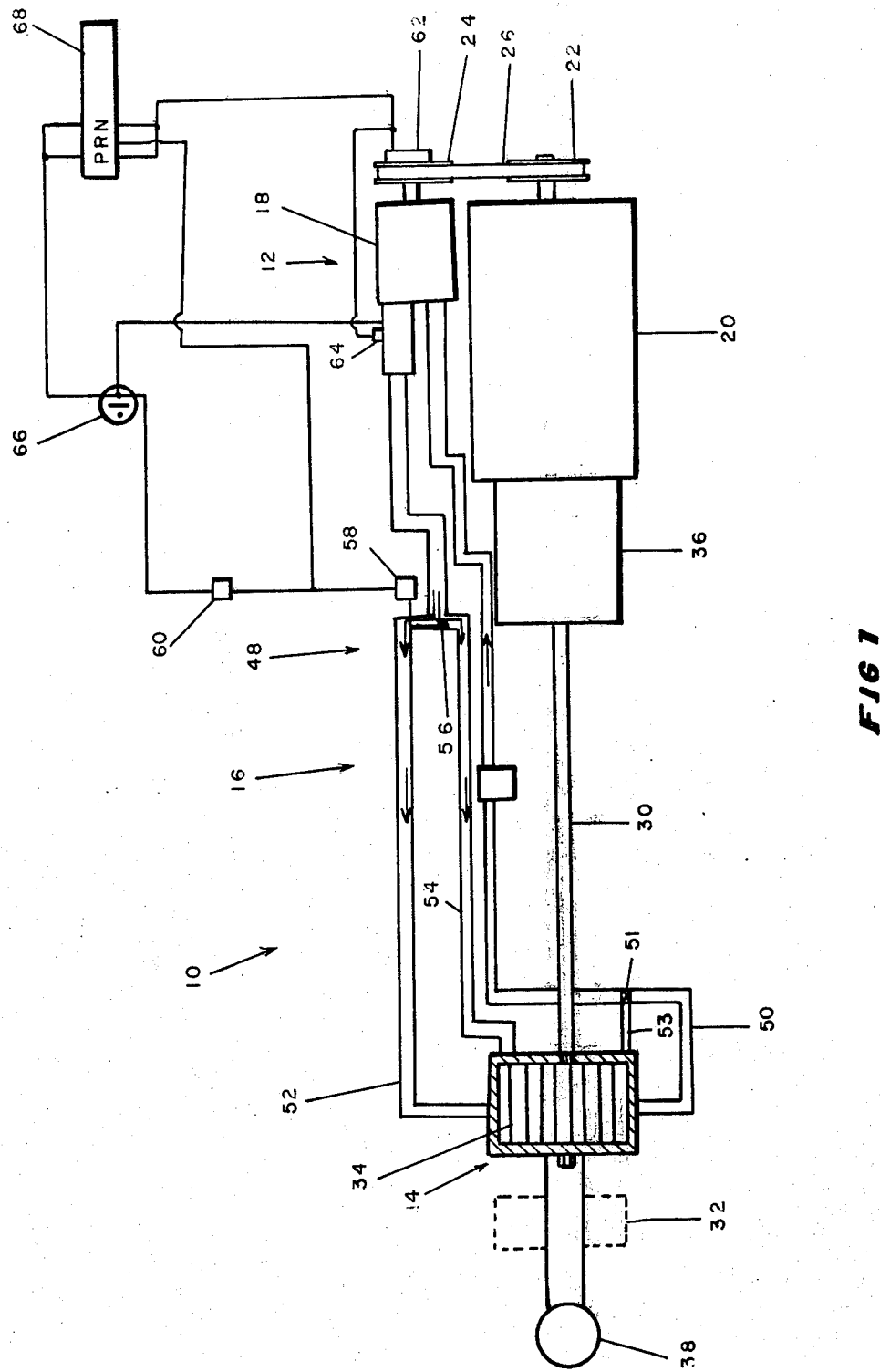

AUXILLIARY FLUID POWER SYSTEM

BACKGROUND OF THE INVENTION

1. Field of the Invention

An auxilliary fluid power system for use with a prime mover such as an internal combustion engine to selectively boost or retard the power of the prime mover.

2. Description of the Prior Art

Typically vehicular prime movers employ indirect braking; that is, wheel braking to control deceleration. Of course, these wheel braking structures are by their very function subject to serious wear. Such wear reducing the effectiveness of the braking systems. Such reduced effectiveness endangering the vehicular traffic.

Various supplemental or auxilliary systems have been developed to aid such wheel braking systems. Often these systems are coupled to the main drive train to act directly on the prime mover. Use of compressed air or exhaust gasses in these systems is common. Unfortunately these systems are generally of limited capacity and effectiveness. Further many such structures are complicated and structurally elaborate.

Other supplemental or auxilliary systems have been devised to boost the output power of the main drive train of the prime mover. As in the braking systems, such structures are generally complicated and of limited effectiveness.

More elaborate structures have been developed which attempt to combine the brake and boost functions of the two independent systems. These combined structures are inherently more complicated and prone to mechanical malfunctions. As a result any engineered advantages are often outweighted by the difficulties and expense of operational maintenance and repair.

SUMMARY OF THE INVENTION

The present invention relates to an auxillary fluid power system for use with a prime mover such as an internal combustion engine to selectively boost or retard the power of the prime mover. More specifically, the auxilliary fluid power system comprises a fluid drive means, auxilliary drive means, fluid conduct means and control means.

The fluid drive means comprises a hydraulic pump operatively coupled to the prime mover by a pulley/belt combination or other suitable means to operate the auxilliary means as more fully described hereinafter.

The auxilliary drive means comprises an enclosure including a rotor housing having a rotor coupled to the prime mover disposed therein and a fluid sump coupled to the fluid drive means by the fluid conduit means.

The fluid conduit means comprises a fluid supply conduit and a fluid return conduit. The fluid supply conduit comprises a first supply branch and second supply branch coupled between the rotor housing and the fluid drive means to selectively drive the auxilliary drive means in the forward or reverse direction as more fully described hereinafter. The fluid return conduit is coupled between the fluid sump and fluid drive means to return the fluid from the auxilliary drive means to the fluid drive means.

The control means includes a multiple position selector valve having a first, second and third position, selector valve control and a selector valve control switch operatively coupled thereto to control the position thereof. In addition the control means includes an electric clutch coupled to the fluid drive means, and pressure safety switch.

In operation, the prime mover is started with the transmission selector in the "park" or "neutral" position. As a result, the electric clutch will disengage the hydraulic pump from the prime mover to ensure that the auxilliary fluid power system does not drive the prime mover. In addition, the pressure safety operates the selector valve control to move the selector valve to the third position to block the output from the hydraulic pump through the fluid supply conduit.

When in forward gear accelerating acelerating the selector valve control switch operates the valve to the first position through the valve control causing fluid to flow from the hydraulic pump through the first supply branch to the auxilliary drive means. Upon entering the rotor housing the fluid impinges on the rotor driving the rotor in the forward direction boosting the power rain of the prime mover. When decelerating, the selector valve control switch operates the valve to the second position through the valve control causing fluid to flow from the hydraulic pump through the second supply branch to the auxilliary drive means. Upon entering the rotor housing the fluid impinges on the rotor driving the rotor in the reverse direction retarding the power train of the prime mover.

When in reverse gear, the selector valve control switch operates the valve to the second position through the valve control causing fluid to flow from the hydraulic pump through the second supply branch to the auxilliary drive means. Upon entering the rotor housing the fluid impinges on the rotor driving the rotor in the reverse direction boosting the power train of the prime mover in the reverse direction.

As the fluid drives the rotor, the fluid enters the fluid sump and returns to the hydraulic pump through the fluid return conduit.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and the objects of the invention, reference should be had to the following detailed description taken in connection with the accompanying drawings in which:

FIG. 1 is a schematic view of an auxilliary fluid power system.

Similar reference characters refer to similar parts throughout the several view of the drawings.

DETAILED DESCRIPTION OF THE PREFERRED EMBODIMENT

Figure 3:
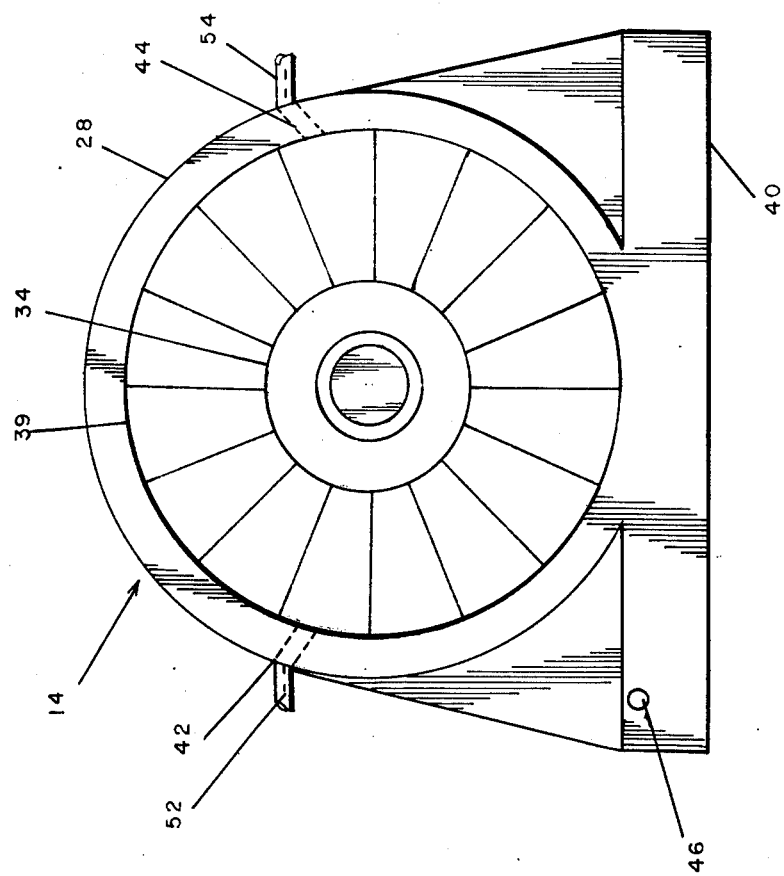

As shown in FIG. 1, the present invention relates to an auxilliary fluid power system generally indicated as 10 for use with a prime mover such as an internal combusion engine to selectively boost or retard the power of the prime mover. As shown, the auxilliary fluid power system 10 comprises a fluid drive means generally indicated as 12, an auxilliary drive means generally indicated as 14, a fluid conduit means generally indicated as 16 and a control means as more fully described hereinafter.

The fluid drive means 12 comprises a hydraulic pump operatively coupled to the prime mover or engine 20 through crank shaft pulley 22, hydraulic pulley 24 and hydraulic pump belt or coupling means 26.

Figure 2:
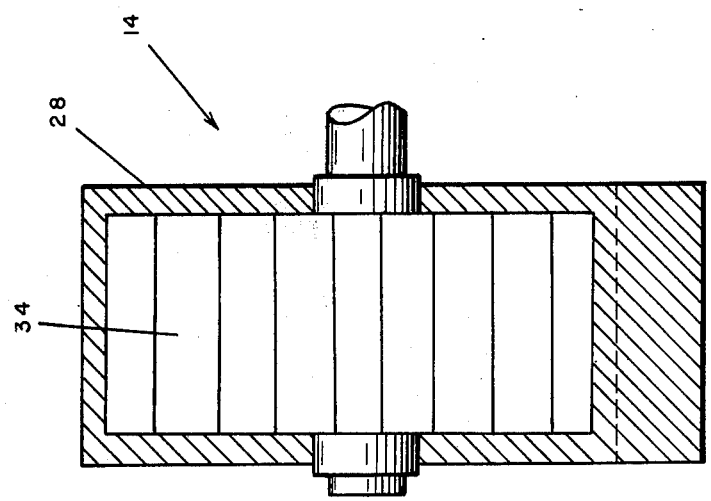
FIG. 2 is a cross-sectional front view of an auxilliary drive means.

As best shown in FIG. 2 the auxilliary drive means 14 comprises an enclosure including a rotor housing 28 coupled between the drive shaft 30 and differential 32 (FIG. 1). The rotor housing 28 is configured to operatively house rotor 34 which is coupled directly to the drive shaft 30 and differential 32 as shown in FIG. 1. In turn, the drive shaft 30 and differential 32 are coupled to the transmission 36 and rear axle 38 of the prime mover respectively. The enclosure further includes a fluid sump 40. As shown, the rotor 34 is rotatably mounted within the rotor housing 28. The rotor housing 28 includes a first and second fluid inlet 42 and 44 respectively coupled to the fluid supply conduit 16 as more fully described hereinafter. An annular ring 39 is disposed in housing 28 adjacent to rotor 34. The fluid sump 40 includes a fluid outlet 46 coupled to a fluid return conduit as more fully described hereinafter.

As shown, the hydraulic pump 18 coupled to the auxilliary drive means 14 by the conduit means 16 which comprises a fluid supply conduit 48 generally and fluid return conduit 50. The fluid return conduit 50 also includes a pressure relief means 51 and fluid pressure relief conduit 53 to relieve over pressure in said fluid return conduit 50. The fluid supply conduit 48 includes a first supply branch 52 and a second supply branch 54 coupled between the auxilliary drive means 14 in the forward and reverse directions as more fully described hereinafter.

The control means comprises a multiple position selector valve 56 having a first and second position, a selector valve control 58 coupled thereto to control the position thereof and a selector valve control switch 60 having a first and second position coupled to the valve control 58 to control the position thereof. In addition the control means includes an electric clutch 62 coupled to the fluid drive means 12 and a pressure safety switch 64 disposed to sense the fluid pressure within the fluid supply conduit 48. The selector valve 56 comprises an element or blade pivotally disposed within the fluid supply conduit 48 to selectively control the direction of flow therethrough. The selector valve control 58 comprises a solenoid to control the position of selector valve 56. The selector valve control 58 is, in turn, coupled to the pressure safety switch 46 and the selector valve control switch 60. The selector valve control switch 60 is coupled to the ignition switch 66 and transmission selector 68 (reverse positions) to control the position switch 60. The pressure safety switch 64 is coupled to the ignition switch 66 and electric clutch 62. The electric clutch 62 is, in turn coupled to the transmission selector 68 (park and neutral positions). When operated with a standard transmission, the electric clutch 62 and selector valve control switch 60 are coupled to a two-position and the backup light switch respectively.

In operation, the prime mover is started with the transmission selector 68 in the Park or Neutral position. As a result, the electric clutch 62 will disengage the hydraulic pump 18 from the prime mover to ensure that the auxilliary fluid power system 10 does not drive the prime mover. In addition, the pressure safety switch 64 operates the selector valve control 58 to move the selector valve 56 to the third position to block the output from the hydraulic pump 18 through the fluid supply conduit 48.

When in forward gear and accelerating the selector valve control switch 60 operates the valve 56 to the first position through the valve control 58 causing fluid to flow from the hydraulic pump 18 through the first supply branch 52 to the auxilliary drive means 14. Upon entering the rotor housing 28 the fluid impinges on the rotor 34 driving the rotor 34 in the forward direction boosting the power train of the prime mover. When decelerating, the selector valve control switch 60 operates the valve 56 to the second position through the valve control 58 causing fluid to flow from the hydraulic pump 18 through the second supply branch 54 to the auxilliary drive means 14. Upon entering the rotor housing 28 the fluid impinges on the rotor 34 driving the rotor 34 in the reverse direction retarding the power train of the prime mover.

When in reverse gear, the selector valve control switch 60 operates the valve 56 to the second position through the valve control 58 causing fluid to flow from the hydraulic pump 18 through the second supply branch 54 to the auxilliary drive means 14. Upon entering the rotor housing 28 the fluid impinges on the rotor 34 driving the rotor 34 the reverse direction boosting the power train of the prime mover in the reverse direction.

As the fluid drives the rotor 34, the fluid enters the fluid sump 40 and returns to the hydraulic pump 18 through the fluid return conduit 56.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the inventions which, as a matter of language, might be said to fall therebetween.

Now that the invention has been described.

What is claimed is:

1. An auxilliary fluid power system for use with a prime mover such as an internal combustion engine having a power train including a control selector: said auxilliary fluid power system comprises a fluid drive means coupled to the power train of the prime mover to drive said fluid drive means, an auxilliary drive means mechanically coupled to the power train, said auxilliary drive means including a housing having a rotor rotatably mounted therein, said housing including a first and second inlet formed thereon, a fluid conduit means coupled between said fluid drive means and said auxilliary drive means to supply fluid from said fluid drive means to said auxilliary drive means, and a control means including a valve means having a first and second position to selectively control the flow of fluid from said fluid drive means to said auxilliary drive means through said fluid conduit means, said fluid conduit means comprises a first and second fluid supply branch, said first and second inlet coupled to said fluid drive means through said first and second supply branches respectively, said rotor operable in a first and second direction, said system further including a valve control having a first and second position, said valve control coupled between the control selector of the power train and said valve means, said first inlet disposed relative to said rotor such that when said valve control is in said first position said valve means is in said first position to control fluid flow through said first conduit branch through said first inlet against said rotor to rotate said rotor in said first direction to boost the output of the power train when operating in the first direction and wherein said second inlet is disposed relative to said rotor such that when said valve control is in said second position said valve means is in said second position to control fluid flow through said second conduit branch through said second inlet against said rotor to rotate said rotor in said second direction to retard the output of the power train when operating in said second position.

2. The auxilliary fluid power system of claim 1 wherein said fluid drive means comprises a fluid pump.

3. The auxilliary fluid power system of claim 2 wherein said fluid pump and the power train of the prime mover are mechanically connected to each other by coupling means.

4. The auxilliary fluid power system of claim 3 wherein said coupling means comprises a first pulley connecting to the power train of the prime mover and a second pulley coupled to said fluid pump, said first and second pulleys operatively coupled by a continuous substantially flexible member.

5. The auxilliary fluid power system of claim 1 wherein said control means further includes a selector valve control switch having a first and second position, said selector control valve switch coupled between said valve control and the control selector of the power train such that when the power train is operating in the first direction and said selector valve control switch is in said first position, said selector valve control in said first position and said selector valve in said first position to cause fluid to flow through said first supply branch and through said first inlet against said rotor rotating said rotor in said first direction to boost the output of the power train and wherein when said selector valve control switch is in said second position when the power train is operating in the first direction, said valve control is in said second position and said selector valve is in said second position and said selector valve is in said second position to cause fluid to flow through second supply branch and through said second inlet against said rotor rotating said rotor in said second direction to retard the output of the power train.

6. The auxilliary power system of claim 1 wherein said fluid conduit means further includes a fluid return conduit and said housing includes at least one outlet, said fluid return conduit coupled between said first outlet and said fluid drive means to return said fluid from said housing to said fluid drive means.

7. The auxilliary fluid power system of claim 7 wherein said fluid conduit means further includes a pressure relief means disposed in said fluid return conduit and a pressure relief conduit coupled between said fluid return conduit and said housing to return fluid from said fluid return conduit to said housing at a predetermined pressure.

8. The auxilliary fluid power system of claim 1 wherein said housing further includes a fluid sump disposed below said rotor to receive fluid therefrom.

9. The auxilliary fluid power system of claim 1 further including pressure sensing means disposed in said fluid conduit means between said fluid drive means and said auxilliary drive means to sense the pressure therein, and wherein said fluid drive means further includes clutch means and said pressure sensing means coupled to said clutch means to disengage said fluid drive means from said power train when said pressure reaches a predetermined level.

* * * * *